No. 892,923. PATENTED JULY 7, 1908.
T. J. WINANS.
GEARING.
APPLICATION FILED DEC. 30, 1907.
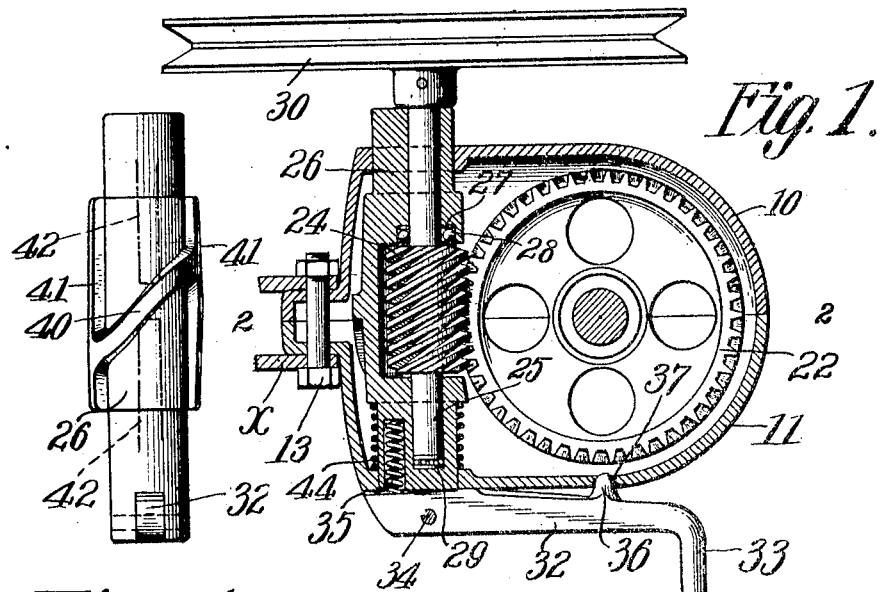
Fig. 1.
Fig. 4.
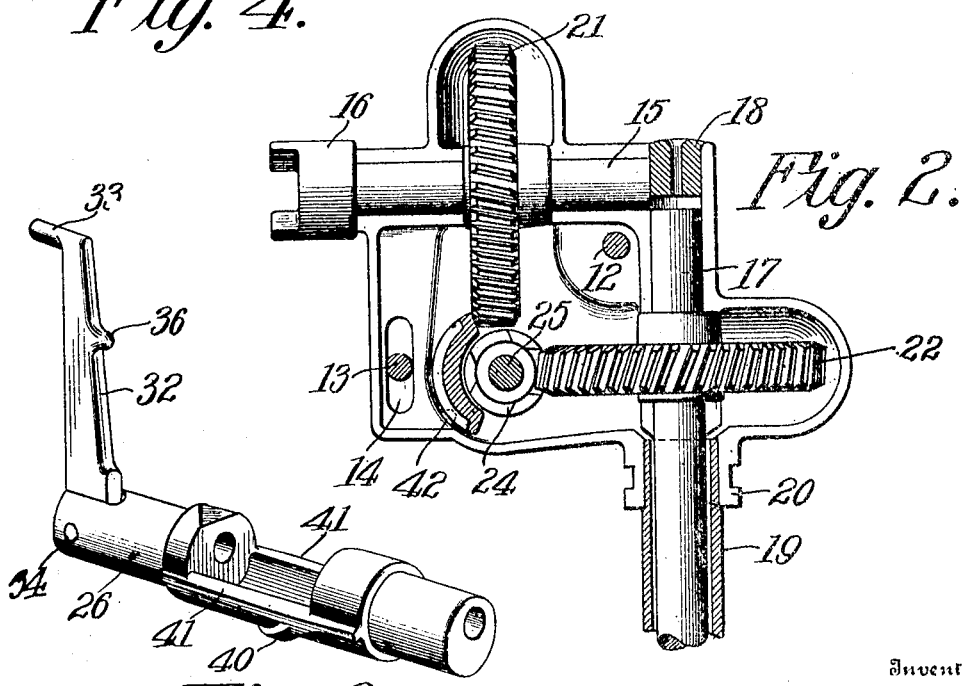
Fig. 2.
Fig. 3.
Witnesses
Inventor
Thomas J. Winans.
By
Attorneys

UNITED STATES PATENT OFFICE.

THOMAS J. WINANS, OF BINGHAMTON, NEW YORK, ASSIGNOR TO THE "1900" WASHER COMPANY, OF BINGHAMTON, NEW YORK.

GEARING.

No. 892,923.    Specification of Letters Patent.    Patented July 7, 1908.

Original application filed April 12, 1906, Serial No. 311,273. Divided and this application filed December 20, 1907.
Serial No. 407,339.

*To all whom it may concern:*

Be it known that I, THOMAS J. WINANS, a citizen of the United States, residing at Binghamton, in the county of Broome and State of New York, have invented a new and useful Gearing, of which the following is a specification.

This invention relates to gearing for use in connection with washing machines, and for like purposes, and has for its principal object to provide a mechanism of very simple construction which may be employed for the purpose of transmitting power from a driven shaft to one or other of a pair of secondary shafts, one of which may be provided with suitable connections to a washing machine and the other with connections to a wringer, so that either the washing machine or the wringer may be operated.

A further object of the invention is to provide a gearing connection including a pair of worm-wheels and a driven worm, the latter being mounted in an eccentric sleeve which may be readily turned for the purpose of intermeshing the worm with either of the worm wheels, the construction being such that the shifting operation will be practically noiseless and which may be accomplished without danger of stripping or otherwise injuring the teeth.

A further and important object of the invention is to provide a worm gearing including a worm that is movable into and out of mesh with the gear, in which provision is made for screwing the worm into engagement with the teeth of the gear, so that the intermeshing operation will be gradual and without jar or shock.

A still further object of the invention is to provide a worm gearing in which the worm receives movement in the direction of its length, as it is moved into and out of mesh with the worm wheel.

A still further object of the invention is to provide a worm gearing including a worm movable into and out of mesh with the worm wheel, in which provision is made for insuring the full intermeshing of the teeth before the entire load is placed thereon.

A still further object of the invention is to provide a novel form of gear casing, made in two mating sections of such construction as to facilitate the assembling of the parts of the gearing.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a sectional plan view of a worm gearing constructed and arranged in accordance with the invention. Fig. 2 is a transverse sectional view on the line 2—2 of Fig. 1. Fig. 3 is a detail perspective view of the worm carrying sleeve detached. Fig. 4 is a rear elevation of said sleeve.

Similar numerals of reference are employed to indicate corresponding parts throughout the several figures of the drawings.

The gearing is mounted within a suitable casing that is formed of two mating sections 10 and 11, of such nature as to form housings for the several gears, and these are secured together by a pair of bolts 12 and 13, the latter bolt, 13, passing through vertical slots 14 that are formed in the members of the casing for the purpose of permitting vertical adjustment of the casing in order that the gearing carried thereby may be properly coupled to a wringer or other machine to be operated. In the present instance the bolt is shown as extending through a pair of plates *x* which may be employed for the purpose of supporting the wringer.

The upper portion of the casing forms a split bearing for a shaft 15 which is provided at one end with a coupling 16 by which it may be connected to the wringer or other device to be driven. The two parts of the casing also form a bearing for the upper end of a vertical shaft 17 which, in the present instance, is designed to extend downward for connection to a washing machine or the like.

In order to hold the sections of the casing in permanent alinement, a plug 18 is introduced at the upper end of the bore in which shaft 17 is mounted, and the lower portion of the casing is provided with a split collar 20 that is bored out for the reception of a tube 19, the tube forming a housing for the shaft and serving also as a partial support for the gear casing, and at the same time acting in connection with the plug 18 to maintain the sections of the casing in proper alinement.

In order to insure proper bearings for the shafts, the two sections of the casing are first firmly bolted together, and the casing is then bored for the shafts, so that after the parts are assembled and the bolts are tightened, it will be impossible for the sections of the casing to be clamped so firmly on the shafts as to frictionally retard their movement.

The two shafts 15 and 17 are provided with worm wheels 21 and 22, respectively, and these are arranged to be engaged by a quick running worm 24 that is carried by a worm shaft 25 mounted eccentrically in a carrying sleeve 26. The opposite ends of the sleeve 26 are reduced to form journals that find bearings in openings formed in the members 10 and 11 of the casing.

In practice, the worm is made in the form of a sleeve or collar and the sleeve 26 is bored out to receive a pair of hardened rings 27, between which are arranged anti-friction balls 28, and that end of the sleeve which is bored to receive the shaft is, also, provided with an anti-friction thrust bearing 29. After the shaft has been slipped into place through the sleeve, the rings 27, and the worm, the latter is firmly secured to the shaft by a suitable pin or other connection.

The axis of the sleeve 26 is at the intersection of two planes passing centrally through the faces of the worm wheels 21 and 22. The axis of the worm shaft 25 is located at a distance from the axis of the sleeve 26 slightly greater than the depth of the worm tooth, so that very slight movement is necessary to engage and disengage the worm and worm wheels. The intermediate portion of the sleeve is cut away, as shown, in order that the worm may freely engage the worm wheels.

Secured to one end of the worm shaft 25 is a driving member which, in the present instance, takes the form of a grooved belt wheel 30. That end of the sleeve opposite the belt wheel 30 projects beyond the outer face of the section 11 of the casing and is bifurcated to receive an adjusting lever 32, the outer end of which has a small handle 33. This lever is pivoted on a pin 34, and the end portion of the lever is engaged by a spring 35 that is seated in a recess formed in the end of the sleeve. The lever is further provided with a small projection 36 that is arranged to enter one or other of a pair of locking recesses 37 that are formed in the casing; one of these recesses being in the same horizontal plane with the axis of the sleeve, and the other in the vertical plane with such axis.

In apparatus of this type, where a worm is moved into and out of mesh with a worm wheel, it is found that where the worm is turning at high speed and there is a heavy load, there is considerable wear between the teeth of the worm and wheel at the instant of starting, the wear being much greater than that due to the constant turning of the same load.

In order to overcome the starting friction due to inertia, provision is made for moving the worm endwise during the operation of throwing it into and out of gear, and to screw the worm into the worm wheel, thus insuring full mesh of the teeth and preventing undue strain and the imposition of a full load until the teeth are in full engagement. To accomplish this, the rear face of the sleeve 26 is provided with one or more helically wound teeth, one tooth 40 being shown in Fig. 4, and this tooth is pitched at a greater angle than the teeth of the worm, and runs partly around the back of the cylinder, its ends terminating at two shoulders 41 that are parallel with the axial line of the sleeve.

Each section of the casing is provided with an inwardly extending abutment 42, the adjacent ends of said abutments being spaced from each other and disposed on lines that are inclined to correspond to the thread or tooth 40, so that when the sleeve is turned, it will be compelled to travel in the helical path dictated by the passage of the thread or tooth 40 between the two abutments, and the extent of endwise movement thus imparted is sufficient to bring the worm teeth into gradual mesh with the teeth of the wheel, the worm teeth screwing gradually toward the full mesh position, and thus connecting the gearing without danger of shock or jar and without undue wear at any point, while the frictional resistance due to inertia is gradually overcome.

Surrounding one end of the sleeve is a spring 44 that bears against an annular flange formed on the sleeve, and against the inner wall of one section of the casing, this spring being placed under compression during endwise movement of the worm carrying sleeve in one direction, and serving to assist in the return movement of the worm in the opposite direction.

When the parts are arranged as shown in Figs. 1 and 2, power is being transmitted from the worm to the worm wheel 22. To shift the worm into engagement with the worm wheel 21, it is merely necessary to slightly pull the outer end of the lever 32 to disengage the projection 36 from the recess 37, and then turn the lever and the sleeve through an arc of 90°. This will cause the tooth 40 of the sleeve to travel in the space between the two abutments 42, so that the worm carrying sleeve will be moved in the direction of its length while being turned, and the teeth of the worm will be gradually moved out of engagement with the teeth of the wheel 22, and will gradually screw into engagement with the teeth of the wheel 21, the operation being practically noiseless and accomplished without shock or jar. At the completion of the movement, one or other of the flanges or shoulders 41 will come into engagement with the abutments and form a stop for limiting the turning movement of the sleeve.

The driving mechanism is found very simple and efficient in practice, and may be readily shifted by a woman or child without the slightest injury.

The present application is a division of Letters-Patent issued to me on January 15, 1907, under No. 841,606.

I claim:—

1. In a worm gearing, a worm wheel, a worm movable into and out of mesh with the wheel, and means independent of the teeth of the wheel for moving the worm in a helical path during its movement toward and from the worm wheel.

2. In worm gearing, a worm wheel, a worm movable into and out of mesh with the wheel, and means independent of the teeth of the wheel for gradually screwing the worm tooth into engagement with the wheel during the meshing operation.

3. In worm gearing, a worm wheel, a worm movable into and out of mesh with the wheel, and means for gradually screwing the worm into meshed position to thereby prevent the imposition of the load until the teeth are fully engaged.

4. In worm gearing, a worm wheel, a worm movable into and out of mesh with the wheel, a sleeve in which the worm is eccentrically mounted, said sleeve being angularly adjustable to effect the movement of the worm into and out of engagement with the wheel, and means for imparting endwise movement to said sleeve during the angular movement thereof.

5. In worm gearing, a worm wheel, a worm, an angularly adjustable sleeve in which the worm is eccentrically mounted, said sleeve being adjustable to move the worm into and out of mesh with the wheel, and means for imparting endwise movement to the sleeve during the angular movement thereof.

6. In worm gearing, a worm wheel, a worm, and a helically movable sleeve in which said worm is eccentrically mounted.

7. In worm gearing, a worm wheel, a worm, a helically movable sleeve in which the worm is eccentrically mounted, said sleeve having a helical rib or tooth projecting therefrom, and a pair of spaced stationary abutments between which said rib is engaged.

8. In worm gearing, a pair of shafts disposed at an angle to each other, worm wheels carried by the shafts, a worm, and a helically movable bearing sleeve in which said worm is eccentrically mounted, said sleeve being adjustable to move the worm gradually into or out of mesh with either of said worm wheels.

9. In mechanism of the class described, a plurality of shafts disposed at an angle to each other, worm wheels carried by the shafts, a bearing sleeve having as its longitudinal axis the line formed by the intersecting median planes of the several worm wheels, and a worm eccentrically mounted in the sleeve, the sleeve being angularly adjustable to move the worm into mesh with the various wheels.

10. In mechanism of the class described, a pair of shafts disposed at an angle to each other, worm wheels carried by the shafts, a bearing sleeve having as its longitudinal axis the line formed by the intersecting median planes of both worm wheels, and a worm eccentrically mounted in the sleeve, the sleeve being angularly adjustable to move the worm into or out of mesh with either of such worm wheels.

11. In apparatus of the class described, a casing, a pair of shafts mounted therein, worm wheels on said shafts, an adjustable bearing sleeve, the axis of which is at the line of intersection of the mid planes of the worm gears, a worm eccentrially mounted in the sleeve, a sleeve shifting lever pivoted at one end to the sleeve, and means for locking said lever in either of two positions with the worm in engagement with either of the worm wheels.

12. The combination with a two part casing arranged to form a split bearing, of a pair af shafts mounted in said bearing and having their axes approximately at a right angle to each other, worm wheels mounted on said shafts, a bearing sleeve having end journals mounted in the sections of the casing, said sleeve being provided with a stop for limiting turning movement of the same, one end of the sleeve projecting beyond the outer wall of the casing and being bifurcated, a lever pivoted within the bifurcated portion of the sleeve, said lever having a projection carried thereby arranged to enter locking recesses formed in the casing, a spring tending to move said lever to locking position, and a worm mounted eccentrically in the sleeve and arranged to mesh with either of said worm wheels.

13. In combination, a two part casing, a pair of shafts mounted therein and having their axes approximately at a right angle to each other, worm wheels on said shafts, a worm arranged to engage with each of said worm wheels, a worm shaft, a sleeve mounted in bearings in the casing, and in which said shaft is eccentrically mounted, ball thrust bearings between one end of the worm and the sleeve, said sleeve having a stop for limiting turning movement thereof, and means for adjusting the sleeve to move the worm out of mesh with one of the worm wheels and into mesh with the other of such worm wheels.

14. In combination, a casing, a pair of shafts mounted in the casing and having their axes at an angle to each other, worm wheels carried by the shafts, a bearing sleeve mounted in the casing and provided with a helical rib or tooth, a pair of abutments carried by the casing and spaced for the reception of said rib or tooth, a spring surrounding a portion of the sleeve and tending to move the same in the direction of its length, and a worm eccentrically mounted in the sleeve and movable with the latter in a helical path into and out of engagement with either of said worm wheels.

In testimony that I claim the foregoing as my own, I have hereto affixed my signature in the presence of two witnesses.

THOMAS J. WINANS.

Witnesses:
 HARRY L. BARKER,
 W. H. SOUTHWORTH.